(12) United States Patent
Kook et al.

(10) Patent No.: US 9,995,368 B2
(45) Date of Patent: Jun. 12, 2018

(54) PLANETARY GEAR TRAIN OF AN AUTOMATIC TRANSMISSION FOR VEHICLES

(71) Applicant: Hyundai Motor Company, Seoul (KR)

(72) Inventors: Jae Chang Kook, Hwaseong-si (KR); Seongwook Ji, Gunpo-si (KR); Woo Jin Chang, Suwon-si (KR); Wonmin Cho, Hwaseong-si (KR); Hyun Sik Kwon, Seoul (KR); Seong Wook Hwang, Gunpo-si (KR); Ki Tae Kim, Incheon (KR)

(73) Assignee: Hyundai Motor Company, Seoul (KR)

( * ) Notice: Subject to any disclaimer, the term of this patent is extended or adjusted under 35 U.S.C. 154(b) by 0 days. days.

(21) Appl. No.: 15/375,908

(22) Filed: Dec. 12, 2016

(65) Prior Publication Data

US 2017/0268631 A1 Sep. 21, 2017

(30) Foreign Application Priority Data

Mar. 16, 2016 (KR) .................. 10-2016-0031476

(51) Int. Cl.
*F16H 3/66* (2006.01)

(52) U.S. Cl.
CPC ....... *F16H 3/66* (2013.01); *F16H 2200/0069* (2013.01); *F16H 2200/0095* (2013.01); *F16H 2200/2012* (2013.01); *F16H 2200/2048* (2013.01)

(58) Field of Classification Search
None
See application file for complete search history.

(56) References Cited

U.S. PATENT DOCUMENTS

| 7,566,283 | B2* | 7/2009 | Gumpoltsberger ....... F16H 3/66 475/275 |
| 8,870,705 | B2 | 10/2014 | Diemer et al. |
| 8,992,371 | B1 | 3/2015 | Shim et al. |
| 2012/0329600 | A1* | 12/2012 | Park .......................... F16H 3/66 475/276 |
| 2013/0072343 | A1* | 3/2013 | Shim ........................ F16H 3/66 475/276 |
| 2015/0111690 | A1 | 4/2015 | Shim et al. |

FOREIGN PATENT DOCUMENTS

| JP | 2015-78763 | 4/2015 |
| KR | 1020130031453 A | 7/2013 |
| KR | 1020140046240 A | 5/2014 |

* cited by examiner

*Primary Examiner* — Erin D Bishop
(74) *Attorney, Agent, or Firm* — Lempia Summerfield Katz LLC

(57) ABSTRACT

A planetary gear train of an automatic transmission for a vehicle may include an input shaft from an engine, an output shaft, and first, second, third, and fourth planetary gear sets each including three rotation elements. The gear train also includes eight shafts for selectively connecting the planetary gear sets and the input and output shafts in various configurations to achieve at least ten forward speeds and at least four reverse speeds.

8 Claims, 2 Drawing Sheets

FIG. 2

| Shift-stage | Control element | | | | | | | Gear ratio |
|---|---|---|---|---|---|---|---|---|
| | C1 | C2 | C3 | C4 | B1 | B2 | B3 | |
| D1 | | | ● | ● | | | ● | 3.511 |
| D2 | | ● | ● | | | | ● | 2.100 |
| D3 | | ● | ● | | | ● | | 1.332 |
| D4 | ● | ● | ● | | | | | 1.000 |
| D5 | ● | ● | | | ● | | | 0.938 |
| D6 | | ● | ● | | ● | | | 0.784 |
| D7 | | ● | | ● | ● | | | 0.741 |
| D8 | | | ● | ● | ● | | | 0.677 |
| D9 | ● | | | ● | ● | | | 0.543 |
| D10 | | | | ● | ● | ● | | 0.419 |
| REV1 | ● | | | ● | | | ● | -3.817 |
| REV2 | ● | | ● | | | | ● | -2.310 |
| REV3 | ● | | | | ● | | ● | -1.829 |
| REV4 | | | ● | | ● | | ● | -1.097 |

PLANETARY GEAR TRAIN OF AN AUTOMATIC TRANSMISSION FOR VEHICLES

CROSS-REFERENCE TO RELATED APPLICATION

This application claims priority to and the benefit of Korean Patent Application No. 10-2016-0031476 filed in the Korean Intellectual Property Office on Mar. 16, 2016, the entire contents of which are incorporated herein by reference.

BACKGROUND (a) Field of the Disclosure

The present disclosure relates to automatic transmissions for vehicles. More particularly, the present disclosure relates to a planetary gear train of an automatic transmission for a vehicle.

(b) Description of the Related Art

Generally, automatic transmissions achieving more speed stages have been developed to enhance fuel economy and optimize drivability. Increasing oil prices have triggered fierce competition to enhance vehicle fuel consumption.

Therefore, research into weight reduction and enhancing fuel economy through downsizing of an engine has been conducted. Research has also been conducted for securing drivability and fuel economy through multiple speed stages of automatic transmissions.

However, in an automatic transmission, as the number of speed stages increase, the number of internal components (particularly, planetary gear sets) increase. As a result, the length of a transmission increases, which may deteriorate the mountability, cost, weight, transmission efficiency, and the like.

In recent years, 8-speed automatic transmissions have been implemented. Research and development of a planetary gear train capable of implementing more speed stages have also been actively conducted.

However, a conventional 8-speed automatic transmission typically includes three to four planetary gear sets and five to seven control elements (frictional elements). Thus, since the length of the automatic transmission increases, mountability may deteriorate.

Recently, one planetary gear set disposed above another planetary gear set has been attempted, but structures of automatic transmissions utilizing parallel planetary gear sets are very limited.

Employing dog clutches instead of wet-type control elements has also been used. However, shift feel may deteriorate.

The above information disclosed in this Background section is only to enhance understanding of the background of the disclosure. Therefore, the background may contain information that is not prior art that is already known in this country to a person of ordinary skill in the art.

SUMMARY

The present disclosure is directed to a planetary gear train of an automatic transmission for a vehicle. The disclosed planetary gear train improves power delivery performance and fuel economy by achieving at least ten forward speed stages and at least four reverse speed stages.

A planetary gear train of an automatic transmission for a vehicle according to an embodiment of the present disclosure may include: an input shaft receiving torque of an engine; an output shaft outputting torque; a first planetary gear set including first, second, and third rotational elements; a second planetary gear set including fourth, fifth, and sixth rotational elements; a third planetary gear set including seventh, eighth, and ninth rotational elements; a fourth planetary gear set including tenth, eleventh, and twelfth rotational elements; a first shaft connecting the first rotational element with the fourth rotational element; a second shaft connected with the second rotational element; a third shaft connecting the third rotational element and the seventh rotational element; a fourth shaft connected with the fifth rotational element, selectively connected with the second shaft, and directly connected with the input shaft; a fifth shaft connected with the sixth rotational element and selectively connected with the second shaft; a sixth shaft connecting the eighth rotational element and the twelfth rotational element and selectively connected with the fifth shaft; a seventh shaft connecting the ninth rotational element and the tenth rotational element and selectively connected with the fourth shaft; and an eighth shaft connected with the eleventh rotational element and directly connected with the output shaft.

Each of the first shaft, the third shaft and the sixth shaft may be selectively connectable to a transmission housing.

The first, second, and third rotational elements of the first planetary gear set may be a first sun gear, a first planet carrier, and a first ring gear, respectively. The fourth, fifth, and sixth rotational elements of the second planetary gear set may be a second sun gear, a second planet carrier, and a second ring gear, respectively. The seventh, eighth, and ninth rotational elements of the third planetary gear set may be a third sun gear, a third planet carrier, and a third ring gear, respectively. The tenth, eleventh, and twelfth rotational elements of the fourth planetary gear set may be a fourth sun gear, a fourth planet carrier, and a fourth ring gear, respectively.

The planetary gear train may further include a first clutch selectively connecting the second shaft with the fourth shaft, a second clutch selectively connecting the fourth shaft with the seventh shaft, a third clutch selectively connecting the second shaft with the fifth shaft, a fourth clutch selectively connecting the fifth shaft with the sixth shaft, a first brake selectively connecting the first shaft to the transmission housing, a second brake selectively connecting the third shaft to the transmission housing, and a third brake selectively connecting the sixth shaft to the transmission housing.

A planetary gear train of an automatic transmission for a vehicle according to an embodiment of the present disclosure may include: an input shaft receiving torque of an engine; an output shaft outputting torque; a first planetary gear set including first, second, and third rotational elements; a second planetary gear set including fourth, fifth, and sixth rotational elements; a third planetary gear set including seventh, eighth, and ninth rotational elements; and a fourth planetary gear set including tenth, eleventh, and twelfth rotational elements. The input shaft may be connected to the first rotational element, the output shaft may be connected to the eleventh rotational element, the first rotational element may be connected with the fourth rotational element, the third rotational element may be connected with the seventh rotational element, the fifth rotational element may be selectively connected with the second, rotational element, the sixth rotational element may be selectively connected with the second rotational element, the eighth rotational element may be connected with the twelfth rotational element and selectively connected with the sixth rotational element, and the ninth rotational element may be connected with the tenth rotational element and selectively connected with the fifth rotational element.

Each of the first rotational element, third rotational element and eighth rotational element may be selectively connectable to a transmission housing.

The first, second, and third rotational, elements of the first planetary gear set may be a first sun gear, a first planet carrier, and a first ring gear, respectively. The fourth, fifth, and sixth rotational elements of the second planetary gear set may be a second sun gear, a second planet carrier, and a second ring gear, respectively. The seventh, eighth, and ninth rotational elements of the third planetary gear set may be a third, sun gear, a third planet carrier, and a third ring gear, respectively. The tenth, eleventh, and twelfth rotational elements of the fourth planetary gear set may a fourth sun gear, a fourth planet carrier, and a fourth ring gear, respectively.

The planetary gear train may further include a first clutch selectively connecting the second rotational element with the fifth rotational element, a second clutch selectively connecting the fifth rotational element with the ninth rotational element, a third clutch selectively connecting the second rotational element with the sixth rotational element, a fourth clutch selectively connecting the sixth rotational element with the eighth rotational element, a first brake selectively connecting the first rotational element with the transmission housing, a second brake selectively connecting the third rotational element with the transmission housing, and, a third brake selectively connecting the eighth rotational element with the transmission housing.

A planetary gear train according to an embodiment of the present disclosure may achieve ten forward speed stages and four reverse speed stages by combining four simple planetary gear sets with six control elements.

In addition, a planetary gear train according to an embodiment of the present disclosure may achieve speed stages suitable for an engine rotational, speed by performing multiple-speed stages of the automatic transmission. Particularly, silent driving of the vehicle or noise reduction may be improved by using an operation point set at a low rotational speed region of an engine. In addition, the planetary gear train according to an embodiment of the present disclosure may maximize engine driving efficiency and may improve power delivery performance and fuel consumption.

Other effects obtainable or predictable from the embodiments of the present disclosure are explicitly or implicitly described in the DETAILED DESCRIPTION section below. In other words, various effects predictable from the embodiments of the present disclosure will be described in the DETAILED DESCRIPTION section below.

BRIEF DESCRIPTION OF THE DRAWINGS

FIG. 2 is an operation chart of control elements at each speed stage in the planetary gear train according to an embodiment of the present disclosure.

DETAILED DESCRIPTION OF THE EMBODIMENTS

Figure 1:
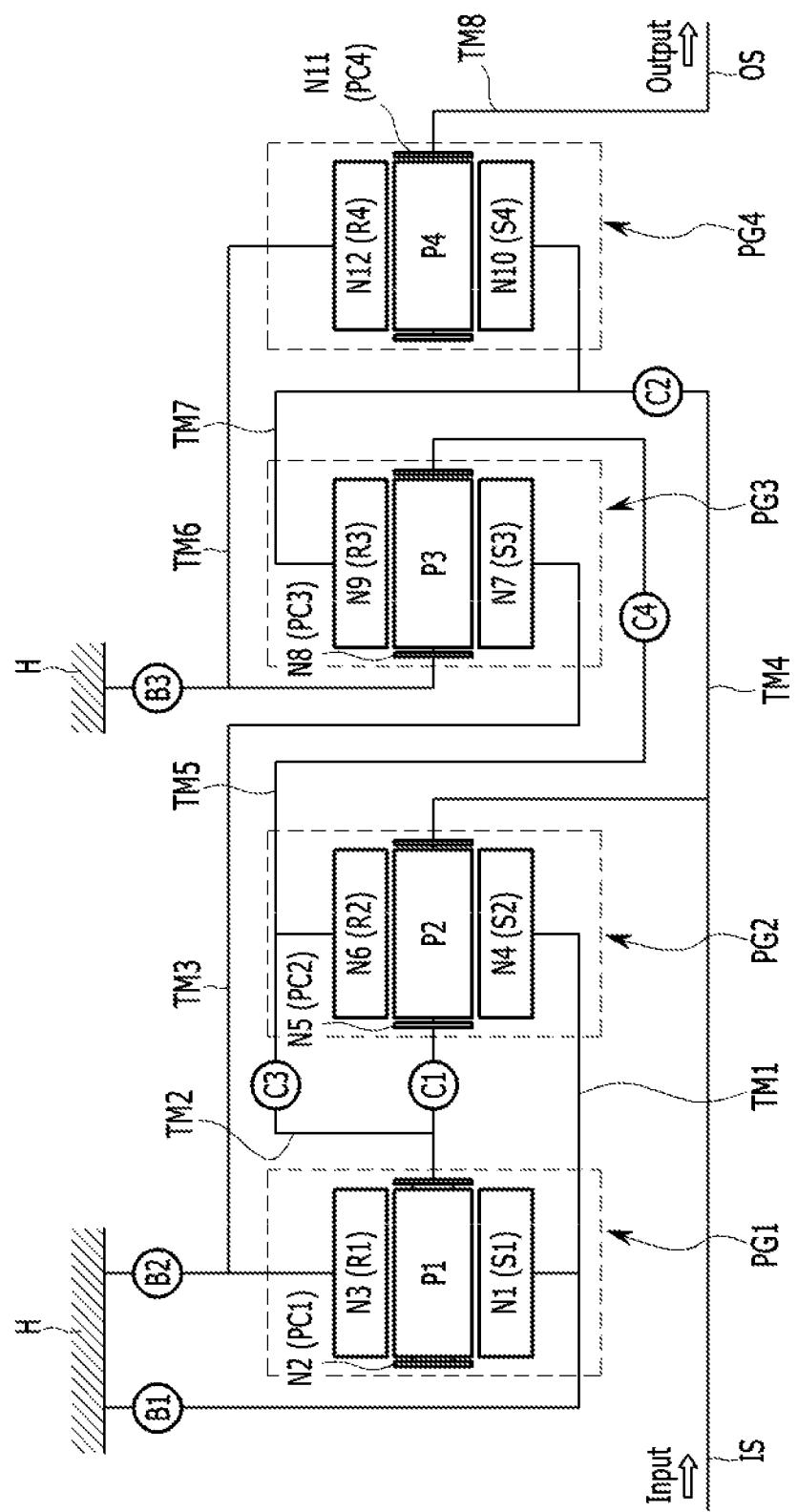
FIG. 1 is a schematic diagram of a planetary gear train according to an embodiment of the present disclosure.

It is desired to develop a planetary gear train capable of representing maximum efficiency by a small number of components in order to increase fuel efficiency through multi-staging of speed changes or gear shifts. In this aspect, the present disclosure relates to a planetary gear train of an automatic transmission for a vehicle. The disclosed planetary gear train may improve power delivery performance and reduce fuel consumption by implementing a speed change stage of at least eleven forward speeds using a minimum number of components. The disclosed planetary gear train may also improve silent driving or reduce noise by using an operation point set at a low rotation speed region of an engine.

Hereinafter, one embodiment of the present disclosure is described in detail with reference to the accompanying drawings. In the drawings, the following symbols are used to identify various elements of the disclosed embodiments, wherein:

i. B1, B2, B3 represent first, second and third brakes;
ii. C1, C2, C3, C4 represent first, second, third and fourth clutches;
iii. PG1, PG2, PG3, PG4 represent first, second, third and fourth planetary gear sets;
iv. S1, S2, S3, S4 represent first, second, third and fourth sun gears;
v. PC1, PC2, PC3, PC4 represent first, second, third and fourth planet carriers;
vi. R1, R2, R3, R4 represent first, second, third and fourth ring gears;
vii. IS represents an input shaft;
viii. OS represents an output shaft; and
ix. TM1, TM2, TM3, TM4, TM5, TM6, TM7, TM8 represent first, second, third, fourth, fifth, sixth, seventh, and eighth shafts.

However, parts that are not related with the description are omitted for clearly describing the embodiments of the present disclosure. Also, like reference numerals refer to like or similar elements throughout the specification.

In the following description, using names or terms to identify components such as first, second, third and the like is to differentiate the names because the names of the components are otherwise the same as each other. Such a naming convention is not intended to denote or set an order thereof and the disclosure is not intended to be so limited.

FIG. 1 is a schematic diagram of a planetary gear train according to one embodiment of the present disclosure.

Referring to FIG. 1, a planetary gear train according to one embodiment of the present disclosure includes first, second, third, and fourth planetary gear sets PG1, PG2, PG3, and PG4 disposed on the same axis. In one embodiment, the planetary gear train also includes an input shaft IS, an output shaft OS, eight rotation shafts TM1-TM8 connected to at least one rotational element of the first, second, third, and fourth planetary gear sets PG1, PG2, PG3, and PG4, four clutches C1-C4 that are control elements and three brakes B1, B2 and B3 that are also control elements, and a transmission housing H.

Torque input from the input shaft IS is changed by cooperation of the first, second, third, and fourth planetary gear sets PG1, PG2, PG3, and PG4. The changed torque is output through the output shaft OS.

In this embodiment, the planetary gear sets are arranged in the order of first, second, third and fourth planetary gear sets PG1, PG2, PG3 and PG4 from an engine side.

The input shaft IS is an input member. Torque from a crankshaft of an engine, after being torque-converted through a torque converter, is input into the input shaft IS.

The output shaft OS is an output member. The output shaft OS is disposed in parallel with the input shaft IS and transmits driving torque to a driving wheel through a differential apparatus.

In this embodiment, the first planetary gear set PG1 is a single pinion planetary gear set. The first planetary gear set PG1 includes a first sun gear S1, a first planet carrier PC1 rotatably supporting a first pinion P1 that is externally meshed with the first sun gear S1, and a first ring gear R1 that is internally meshed with the first pinion P1, respectively, as first, second, and third rotational elements N1, N2, and N3.

In this embodiment, the second planetary gear set PG2 is a single pinion planetary gear set. The second planetary gear set PG2 includes a second sun gear S2, a second planet carrier PC2 rotatably supporting a second pinion P2 that is externally meshed with the second sun gear S2, and a second ring gear R2 that is internally meshed with the second pinion P2, respectively, as fourth, fifth, and sixth rotational elements N4, N5, and N6.

In this embodiment, the third planetary gear set PG3 is a single pinion planetary gear set. The third planetary gear set PG3 includes a third sun gear S3, a third planet carrier PC3 rotatably supporting a third pinion P3 that is externally meshed with the third sun gear S3, and a third ring gear R3 that is internally meshed with the third pinion P3, respectively, as seventh, eighth, and ninth rotational elements N7, N8, and N9.

In this embodiment, the fourth planetary gear set PG4 is a single pinion planetary gear set. The fourth planetary gear set PG4 includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4, respectively, as tenth, eleventh, and twelfth rotational elements N10, N11, and N12.

In this embodiment, the first rotational element N1 and the fourth rotational element N4 are directly connected to each other. The third rotational element N3 and the seventh rotational element N7 are directly connected to each other. The eighth rotational element N8 and the twelfth rotational element N12 are directly connected to each other. The ninth rotational element N9 and the tenth rotational element N10 are directly connected to each. The first, second, third and fourth planetary gear sets PG1, PG2, PG3 and PG4 include eight shafts TM1-TM8.

The eight shafts TM1-TM8 are described in further detail below.

The eight shafts TM1-TM8 may be rotation members that directly connect a plurality of rotational elements among the rotational elements of the planetary gear sets PG1, PG2, PG3, and PG4 with each other. The eight shafts TM1-TM8 may also directly connect to any one rotational element of the planetary gear sets PG1, PG2, PG3, and PG4 and rotate with the any one rotational element to transmit torque. The eight shafts TM1-TM8 may also be fixed members that selectively or directly connect any one rotational element of the planetary gear sets PG1, PG2, PG3, and PG4 to the transmission housing H to fix any one of the rotational elements.

In this embodiment, the first shaft TM1 connects the first rotational element N1 (the first sun gear S1) with the fourth rotational element N4 (the second sun gear S2). The first shaft TM1 is also selectively connected to the transmission housing H to be operated as a selective fixed element.

In this embodiment, the second shaft TM2 is connected to the second rotational element N2 (the first planet carrier PC1).

In this embodiment, the third shaft TM3 connects the third rotational element N3 (the first ring gear R1) with the seventh rotational element N7 (the third sun gear S3). The third shaft TM3 is also selectively connected to the transmission housing H to be operated as a selective fixed element.

In this embodiment, the fourth shaft TM4 is connected with the fifth rotational element N5 (the second planet carrier PC2). The fourth shaft TM4 is also selectively connected with the second shaft TM2. The fourth shaft TM4 is also connected to the input shaft IS.

In this embodiment, the fifth shaft TM5 is connected to the sixth rotational element N6 (the second ring gear R2). The fifth shaft TM5 is also selectively connected with the second shaft TM2.

In this embodiment, the sixth shaft TM6 connects the eighth rotational element N8 (the third planet carrier PC3) with the twelfth rotational element (N12 (the fourth ring gear R4). The sixth shaft TM6 is also selectively connected with the fifth shaft TM5. The sixth shaft TM6 is also selectively connected, to the transmission housing H to be operated as a selective fixed element.

In this embodiment, the seventh shaft TM7 connects the ninth rotational element N9 (the third ring gear R3) with the tenth rotational element N10 (the fourth sun gear S4). The seventh shaft TM7 is also selectively connected with the fourth shaft TM4.

In this embodiment, the eighth shaft TM8 is connected to the eleventh rotational element N11 (the fourth planet carrier PC4). The eighth shaft TM8 is also connected to the output shaft OS as an output element.

In addition, in this embodiment, four clutches C1, C2, C3, and 04, which are control elements, are disposed at portions at which any two shafts among the eight shafts TM1-TM8, including the input shaft IS and the output shaft OS, are selectively connected to each other.

In addition, in this embodiment, three brakes B1, B2 and B3, which are control elements, are disposed at portions at which any one shaft among the eight shafts TM1-TM8 is selectively connected to the transmission housing H.

Arrangements of the four clutches C1-C4 and the three brakes B1, B2 and B3 are described in detail below.

In this embodiment, the first clutch C1 is disposed between the second shaft TM2 and the fourth shaft TM4. The first clutch C1 selectively connects the second shaft TM2 with the fourth shaft TM4.

In this embodiment, the second clutch C2 is disposed between the fourth shaft TM4 and the seventh shaft TM7. The second clutch C2 selectively connects the fourth shaft TM4 with the seventh shaft TM7.

In this embodiment, the third clutch C3 is disposed between the second shaft TM2 and the fifth shaft TM5. The third clutch C3 selectively connects the second shaft TM2 with the fifth shaft TM5.

In this embodiment, the fourth clutch C4 is disposed between the fifth shaft TM5 and the sixth shaft TM6. The fourth clutch C4 selectively connects the fifth shaft TM5 with the sixth shaft TM6.

In this embodiment, the first brake B1 is disposed between the first shaft TM1 and the transmission housing H. The first brake B1 selectively connects the first shaft TM1 to the transmission housing H.

In this embodiment, the second brake B2 is disposed between the third shaft TM3 and the transmission housing H. The second brake B2 selectively connects the third shaft TM3 to the transmission housing H.

In this embodiment, the third brake B3 is disposed between the sixth shaft TM6 and the transmission housing H. The third brake B3 selectively connects the sixth shaft TM6 to the transmission housing H.

Since the second clutch C2 selectively connects the fourth shaft TM4 with the seventh shaft TM7, and since the fourth shaft TM4 is directly connected to the input shaft IS as shown in FIG. 1, the second clutch C2 may connect the input shaft IS to the seventh shaft TM7.

The control elements including the first, second, third, and fourth clutches C1, C2, C3, and C4 and the first, second and third brakes B1, B2 and B3 may be frictionally engaging units that are operated by hydraulic pressure. The control elements may be, but not limited to, multi-plate friction elements of a wet type. However, the control elements may also be engaging units that are operated by electrical signal, such as dog clutches, electric clutches, magnetic particle clutches, or the like.

FIG. 2 is an operation chart of the control elements at each speed stage in the planetary gear train according to an embodiment of the present disclosure.

As shown in FIG. 2, three control elements among the first, second, third, and fourth clutches C1, C2, C3, and C4 and the first, second and third brakes B1, B2 and B3 are operated at each speed stage in the planetary gear train according to an embodiment of the present disclosure.

In this embodiment, the third and fourth clutches C3 and C4 and the third brake B3 are simultaneously operated at a first forward speed shift-stage D1.

Torque of the input shaft IS is input to the fourth shaft TM4 in a state where the second shaft TM2 is connected with the fifth shaft TM5 by operation of the third clutch C3 and where the fifth shaft TM5 is connected with the sixth shaft TM6 by operation of the fourth clutch C4. In addition, the sixth shaft TM6 is operated as the fixed element by operation of the third brake B3. In this arrangement, the torque of the input shaft IS is shifted into the first forward speed stage D1 and the first forward speed stage D1 is output through the output shaft OS connected to the eighth shaft TM8.

In this embodiment, the second and third clutches C2 and C3 and the third brake B3 are simultaneously operated at a second forward speed shift-stage D2.

Torque of the input shaft IS is input to the fourth shaft TM4 and the seventh shaft TM7 in a state where the fourth shaft TM4 is connected with the seventh shaft TM7 by operation of the second clutch C2 and where the second shaft TM2 is connected with the fifth shaft TM5 by operation of the third clutch C3. In addition, the sixth shaft TM6 is operated as the fixed element by operation of the third brake B3. In this arrangement, the torque of the input shaft IS is shifted into the second forward speed stage D2 and the second forward speed stage D2 is output through the output shaft OS connected to the eighth shaft TM8.

In this embodiment, the second and third clutches C2 and C3 and the second brake B2 are simultaneously operated at a third forward speed shift-stage D3.

Torque of the input shaft IS is input to the fourth shaft TM4 and the seventh shaft TM7 in a state where the fourth shaft TM4 is connected with the seventh shaft TM7 by operation of the second clutch C2 and where the second shaft TM2 is connected with the fifth shaft TM5 by operation of the third clutch C3. In addition, the third shaft TM3 is operated as the fixed element by operation of the second brake B2. In this arrangement, the torque of the input shaft IS is shifted into the third forward speed stage D3 and the third forward speed stage D3 is output through the output shaft OS connected to the eighth shaft TM8.

In this embodiment, the first, second and third clutches C1, C2, and C3 are simultaneously operated at a fourth forward speed shift-stage D4.

In this arrangement, the second shaft TM2 is connected with the fourth shaft TM4 by operation of the first clutch C1, the fourth shaft TM4 is connected with the seventh shaft TM7 by operation of the second clutch C2, and the second shaft TM2 is connected with the fifth shaft TM5 by operation of the third clutch C3. In this arrangement, the first, second, third, and fourth planetary gear sets PG1, PG2, PG3, and PG4 become lock-up states. In this arrangement, the torque of the input shaft IS is shifted into the fourth forward speed stage D4 and the fourth forward speed stage D4 is output through the output shaft OS connected to the eighth shaft TM8. At the fourth forward speed stage D4, rotation speed that is output through the output shaft OS is the same as the rotation speed of the input shaft IS.

In this embodiment, the first and second clutches C1 and C2 and the first brake B1 are simultaneously operated at a fifth forward speed shift-stage D5.

Torque of the input shaft IS is input to the fourth shaft TM4 and the seventh shaft TM7 in a state where the second shaft TM2 is connected with the fourth shaft TM4 by operation of the first clutch C1 and where the fourth shaft TM4 is connected with the seventh shaft TM7 by operation of the second clutch C2. In addition, the first shaft TM1 is operated as the fixed element by operation of the first brake B1. In this arrangement, the torque of the input shaft IS is shifted into the fifth forward speed stage D5 and the fifth forward speed stage D5 is output through the output shaft OS connected to the eighth shaft TM8.

In this embodiment, the second and third clutches C2 and C3 and the first brake B1 are simultaneously operated at a sixth forward speed shift-stage D6.

Torque of the input shaft IS is input to the fourth shaft TM4 and the seventh shaft TM7 in a state where the fourth shaft TM4 is connected with the seventh shaft TM7 by operation of the second clutch C2 and, where the second shaft TM2 is connected with the fifth shaft TM5 by operation of the third clutch C3. In addition, the first shaft TM1 is operated as the fixed element by operation of the first brake B1. In this arrangement, the torque of the input shaft IS is shifted into the sixth forward speed stage D6 and the sixth forward speed stage D6 is output through the output shaft OS connected to the eighth shaft TM8.

In this embodiment, the second and fourth clutches C2 and C4 and the first brake B1 are simultaneously operated at a seventh forward speed shift-stage D7.

Torque of the input shaft IS is input to the fourth shaft TM4 and the seventh shaft TM7 in a state where the fourth shaft TM4 is connected with the seventh shaft TM7 by operation of the second clutch C2 and where the fifth shaft TM5 is connected with the sixth shaft TM6 by operation of the fourth clutch C4. In addition, the first shaft TM1 is operated as the fixed, element by operation of the first brake B1. In this arrangement, the torque of the input shaft IS is shifted into the seventh forward speed stage D7 and the seventh forward speed stage D7 is output through the output shaft OS connected to the eighth shaft TM8.

In this embodiment, the third and, fourth clutches C3 and C4 and the first brake B1 are simultaneously operated at an eighth forward speed shift-stage D8.

Torque of the input shaft IS is input to the fourth shaft TM4, in a state where the second, shaft TM2 is connected with the fifth shaft TM5 by operation of the third clutch C3 and where the fifth shaft TM5 is connected with the sixth shaft TM6 by operation of the fourth clutch C4. In addition, the first shaft TM1 is operated as the fixed element by operation of the first brake B1. In this arrangement, the torque of the input shaft IS is shifted into the eighth forward speed stage D8 and the eighth forward speed stage D8 is output through the output shaft OS connected to the eighth shaft TM8.

In this embodiment, the first and fourth clutches C1 and C4 and the first brake B1 are simultaneously operated at a ninth forward speed shift-stage D9.

Torque of the input shaft IS is input to the fourth shaft TM4 in a state where the second shaft TM2 is connected with the fourth shaft TM4 by operation of the first clutch C1 and where the fifth shaft TM5 is connected with the sixth shaft TM6 by operation of the fourth clutch C4. In addition, the first shaft TM1 is operated as the fixed element by operation of the first brake B1. In this arrangement, the torque of the input shaft IS is shifted into the ninth forward speed stage D9 and the ninth forward speed stage D9 is output through the output shaft OS connected to the eighth shaft TM8.

In this embodiment, the fourth clutch C4 and the first and second brakes B1 and B2 are simultaneously operated at a tenth forward speed shift-stage D10.

Torque of the input shaft IS is input to the fourth shaft TM4 in a state where the fifth shaft TM5 is connected with the sixth shaft TM6 by operation of the fourth clutch C4. In addition, the first shaft TM1 and the third shaft TM3 are operated as the fixed elements by operation of the first and second brakes B1 and B2. In this arrangement, the torque of the input shaft IS is shifted into the tenth forward speed stage D10 and the tenth forward speed stage D10 is output through the output shaft OS connected to the eighth shaft TM8.

In this embodiment, the first and fourth clutches C1 and C4 and the third brake B3 are simultaneously operated at a first reverse speed shift-stage REV1.

Torque of the input shaft IS is input to the fourth shaft TM4 in a state where the second shaft TM2 is connected with the fourth shaft TM4 by operation of the first clutch C1 and where the fifth shaft TM5 is connected with the sixth shaft TM6 by operation of the fourth clutch C4. In addition, the sixth shaft TM6 is operated as the fixed element by operation of the third brake B3. In this arrangement, the torque of the input shaft IS is shifted into the first reverse speed stage REV1 and the first reverse speed stage REV1 is output through the output shaft OS connected to the eighth shaft TM8 as an inverse rotation speed.

In this embodiment, the first and third clutches C1 and C3 and the third brake B3 are simultaneously operated at a second reverse speed shift-stage REV2.

Torque of the input shaft IS is input to the fourth shaft TM4 in a state where the second shaft TM2 is connected with the fourth shaft TM4 by operation of the first clutch C1 and where the second shaft TM2 is connected with the fifth shaft TM5 by operation of the third clutch C3. In addition, the sixth shaft TM6 is operated as the fixed element by operation of the third brake B3. In this arrangement, the torque of the input shaft IS is shifted into the second reverse speed stage REV2 and the second reverse speed stage REV2 is output through the output shaft OS connected to the eighth shaft TM8 as an inverse rotation speed.

In this embodiment, the first clutch C1 and the first and third brakes B1 and B3 are simultaneously operated at a third reverse speed shift-stage REV3.

Torque of the input shaft IS is input to the fourth shaft TM4 in a state where the second shaft TM2 is connected with the fourth shaft TM4 by operation of the first clutch C1. In addition, the first shaft TM1 and the sixth shaft TM6 are operated as the fixed elements by operation of the first and third brakes B1 and B3. In this arrangement, the torque of the input shaft IS is shifted into the third reverse speed stage REV3 and the third reverse speed stage REV3 is output through the output shaft OS connected to the eighth shaft TM8 as an inverse rotation speed.

In this embodiment, the third clutch C3 and the first and third brakes B1 and B3 are simultaneously operated at a fourth reverse speed shift-stage REV4.

Torque of the input shaft IS is input to the fourth shaft TM4 in a state where the second shaft TM2 is connected with the fifth shaft TM5 by operation of the third clutch C3. In addition, the first shaft TM1 and the sixth shaft TM6 are operated as the fixed elements by operation of the first and third brakes B1 and B3. In this arrangement, the torque of the input shaft IS is shifted into the fourth reverse speed stage REV4 and the fourth reverse speed stage REV4 is output through the output shaft OS connected to the eighth shaft TM8 as an inverse rotation speed.

The planetary gear train according to one embodiment of the present disclosure may achieve at least ten forward speed stages and at least four reverse speed stages by combining four planetary gear sets PG1, PG2, PG3, and PG4 with four clutches C1, C2, C3, and C4 and three brakes B1, B2 and B3.

In addition, the planetary gear train according to one embodiment of the present disclosure may achieve suitable speed stages according to rotation speeds of the engine. Silent driving or reduced noise of the vehicle may be improved by using an operation point set at a low rotational speed region of the engine.

In addition, the planetary gear train according to one embodiment of the present disclosure may maximize engine driving efficiency. Further, power delivery performance and fuel consumption may also improve.

In addition, the planetary gear train according to one embodiment of the present disclosure may achieve four reverse speed stages and may improve reverse driving performance.

While this disclosure has been described in connection with what is presently considered to be practical embodiments, it is to be understood that the disclosure is not limited to the disclosed, embodiments, but, on the contrary, is intended to cover various modifications and equivalent arrangements included within the spirit and scope of the appended claims.

What is claimed is:

1. A planetary gear train of an automatic transmission for a vehicle, the planetary gear train comprising:
   an input shaft receiving torque of an engine;
   an output shaft outputting an output torque;
   a first planetary gear set including a first, a second, and a third rotational element;
   a second planetary gear set including a fourth, a fifth, and a sixth rotational element;
   a third planetary gear set including a seventh, an eighth, and a ninth rotational element;
   a fourth planetary gear set including a tenth, an eleventh, and a twelfth rotational element;
   a first shaft fixedly connecting the first rotational element with the fourth rotational element;
   a second shaft connected with the second rotational element;
   a third shaft fixedly connecting the third rotational element and the seventh rotational element;
   a fourth shaft fixedly connected with the fifth rotational element, selectively connected with the second shaft, and directly connected with the input shaft;

a fifth shaft fixedly connected with the sixth rotational element and selectively connected with the second shaft;
a sixth shaft fixedly connecting the eighth rotational element and the twelfth rotational element and selectively connected with the fifth shaft;
a seventh shaft fixedly connecting the ninth rotational element and the tenth rotational element and selectively connected with the fourth shaft; and
an eighth shaft connected with the eleventh rotational element and directly connected with the output shaft,
wherein the first, second, and third rotational elements of the first planetary gear set are a first sun gear, a first planet carrier, and a first ring gear, respectively;
the fourth, fifth, and sixth rotational elements of the second planetary gear set are a second sun gear, a second planet carrier, and a second ring gear, respectively;
the seventh, eighth, and ninth rotational elements of the third planetary gear set are a third sun gear, a third planet carrier, and a third ring gear, respectively; and
the tenth, eleventh, and twelfth rotational elements of the fourth planetary gear set are a fourth sun gear, a fourth planet carrier, and a fourth ring gear, respectively.

2. The planetary gear train of claim 1, wherein each of the first shaft, the third shaft and the sixth shaft is selectively connectable to a transmission housing.

3. The planetary gear train of claim 2, further comprising:
a first clutch selectively connecting the second shaft with the fourth shaft;
a second clutch selectively connecting the fourth shaft with the seventh shaft;
a third clutch selectively connecting the second shaft with the fifth shaft;
a fourth clutch selectively connecting the fifth shaft with the sixth shaft;
a first brake selectively connecting the first shaft to the transmission housing;
a second brake selectively connecting the third shaft to the transmission housing; and
a third brake selectively connecting the sixth shaft to the transmission housing.

4. A planetary gear train of an automatic transmission for a vehicle, the planetary gear train comprising:
an input shaft receiving torque of an engine;
an output shaft outputting an output torque;
a first planetary gear set including a first, a second, and a third rotational element;
a second planetary gear set including a fourth, a fifth, and a sixth rotational element;
a third planetary gear set including a seventh, an eighth, and a ninth rotational element; and
a fourth planetary gear set including a tenth, an eleventh, and a twelfth rotational element,
wherein the input shaft is fixedly connected to the fifth rotational element,
the output shaft is connected to the eleventh rotational element,
the first rotational element is fixedly connected with the fourth rotational element,
the third rotational element is fixedly connected with the seventh rotational element,
the fifth rotational element is selectively connected with the second rotational element,
the sixth rotational element is selectively connected with the second rotational element, the eighth rotational element is connected with the twelfth rotational element and is selectively connected with the sixth rotational element, and
the ninth rotational element is fixedly connected with the tenth rotational element and is selectively connected with the fifth rotational element, and
wherein the first, second, and third rotational elements of the first planetary gear set are a first sun gear, a first planet carrier, and a first ring gear, respectively,
the fourth, fifth, and sixth rotational elements of the second planetary gear set are a second sun gear, a second planet carrier, and a second ring gear, respectively,
the seventh, eighth, and ninth rotational elements of the third planetary gear set are a third sun gear, a third planet carrier, and a third ring gear, respectively, and
the tenth, eleventh, and twelfth rotational elements of the fourth planetary gear set are a fourth sun gear, a fourth planet carrier, and a fourth ring gear, respectively.

5. The planetary gear train of claim 4, wherein each of the first rotational element, the third rotational element and the eighth rotational element is selectively connectable to a transmission housing.

6. The planetary gear train of claim 5, further comprising:
a first clutch selectively connecting the second rotational element with the fifth rotational element;
a second clutch selectively connecting the fifth rotational element with the ninth rotational element;
a third clutch selectively connecting the second rotational element with the sixth rotational element;
a fourth clutch selectively connecting the sixth rotational element with the eighth rotational element;
a first brake selectively connecting the first rotational element with the transmission housing;
a second brake selectively connecting the third rotational element with the transmission housing; and
a third brake selectively connecting the eighth rotational element with the transmission housing.

7. A planetary gear train of an automatic transmission for a vehicle, the planetary gear train comprising:
an input shaft receiving torque of an engine;
an output shaft outputting an output torque;
a first planetary gear set including a first, a second, and a third rotational element;
a second planetary gear set including a fourth, a fifth, and a sixth rotational element;
a third planetary gear set including a seventh, an eighth, and a ninth rotational element;
a fourth planetary gear set including a tenth, an eleventh, and a twelfth rotational element;
a first shaft fixedly connecting the first rotational element with the fourth rotational element;
a second shaft connected with the second rotational element;
a third shaft fixedly connecting the third rotational element and the seventh rotational element;
a fourth shaft fixedly connected with the fifth rotational element, selectively connected with the second shaft, and directly connected with the input shaft;
a fifth shaft fixedly connected with the sixth rotational element and selectively connected with the second shaft;
a sixth shaft fixedly connecting the eighth rotational element and the twelfth rotational element and selectively connected with the fifth shaft;

a seventh shaft fixedly connecting the ninth rotational element and the tenth rotational element and selectively connected with the fourth shaft; and an eighth shaft connected with the eleventh rotational element and directly connected with the output shaft;

a first clutch selectively connecting the second shaft with the fourth shaft;

a second clutch selectively connecting the fourth shaft with the seventh shaft;

a third clutch selectively connecting the second shaft with the fifth shaft;

a fourth clutch selectively connecting the fifth shaft with the sixth shaft;

a first brake selectively connecting the first shaft to the transmission housing;

a second brake selectively connecting the third shaft to the transmission housing; and a third brake selectively connecting the sixth shaft to the transmission housing, wherein each of the first shaft, the third shaft and the sixth shaft is selectively connectable to a transmission housing.

8. A planetary gear train of an automatic transmission for a vehicle, the planetary gear train comprising:

an input shaft receiving torque of an engine;

an output shaft outputting an output torque;

a first planetary gear set including a first, a second, and a third rotational element;

a second planetary gear set including a fourth, a fifth, and a sixth rotational element;

a third planetary gear set including a seventh, an eighth, and a ninth rotational element; and a fourth planetary gear set including a tenth, an eleventh, and a twelfth rotational element, a first clutch selectively connecting the second rotational element with the fifth rotational element;

a second clutch selectively connecting the fifth rotational element with the ninth rotational element;

a third clutch selectively connecting the second rotational element with the sixth rotational element;

a fourth clutch selectively connecting the sixth rotational element with the eighth rotational element;

a first brake selectively connecting the first rotational element with the transmission housing;

a second brake selectively connecting the third rotational element with the transmission housing; and a third brake selectively connecting the eighth rotational element with the transmission housing, wherein the input shaft is fixedly connected to the fifth rotational element, the output shaft is connected to the eleventh rotational element, the first rotational element is fixedly connected with the fourth rotational element, the third rotational element is fixedly connected with the seventh rotational element, the fifth rotational element is selectively connected with the second rotational element, the sixth rotational element is selectively connected with the second rotational element, the eighth rotational element is connected with the twelfth rotational element and is selectively connected with the sixth rotational element, and the ninth rotational element is fixedly connected with the tenth rotational element and is selectively connected with the fifth rotational element, and wherein each of the first rotational element, the third rotational element and the eighth rotational element is selectively connectable to a transmission housing.

* * * * *